3,481,994
PROCESS FOR THE SYNTHESIS OF CHLOROPRENE
AND ITS DERIVATIVES AND CO-PRODUCTS
Eugene F. Lutz, Concord, Calif., and Joe T. Kelly, Littleton, and David W. Hall, Englewood, Colo., assignors to Marathon Oil Company, Findlay, Ohio, a corporation of Ohio
No Drawing. Filed Jan. 3, 1966, Ser. No. 518,026
Int. Cl. C07c 21/20
U.S. Cl. 260—655           6 Claims

ABSTRACT OF THE DISCLOSURE

The present invention comprises processes for the synthesis of chloroprene and its derivatives from 1,4-dichloro-2-butene comprising heating 1,4-dichloro-2-butene in the conjoint presence of a catalytic amount of a halide catalyst and from about 1 to about 100 pounds of an aprotic solvent per pound of 1,4-dichloro-2-butene and recovering the chloroprene or derivatives thus formed.

---

The present invention relates to new methods for the synthesis of chloroprene and its derivatives and coproducts from 1,4-dichloro-2-butene and its derivatives, and in particular, relates to such processes conducted in the presence of halide catalysts and aprotic solvents.

"Chloroprene and its derivatives" will be used herein to mean not only chloroprene (2-chloro-1,3-butadiene) but also its structural derivatives wherein, in effect, one or more of the hydrogens of chloroprene have been replaced by organic groups, e.g., alkyl groups, aryl groups, alkaryl groups, and nitro groups. Similarly, "1,4-dichloro-2-butene and its derivatives" is used herein to include both $ClCH_2$—$CH$=$CH$—$CH_2Cl$ and its structural derivatives where, in effect, one or more of the hydrogens have been replaced by a non-interfering (with respect to the reactions of the repesent invention) organic group such as those described above. The latter definition is limited to the inclusion of compounds which have at least one hydrogen on a carbon which is with the double bond.

By "aprotic solvents" is meant compositions which are liquid under the conditions of the reaction, which have a high dielectric constant (greater than about 15 at 25° C.), which are dipolar, that is, one part of the molecule has a more positive electrical charge relative to the other parts of the molecule causing the molecule to act as a dipole, are sufficiently inert not to enter into deleterious side reactions to a significant degree under the reaction conditions, and which do not possess hydrogen atoms capable of hydrogen bonding with or transferring to catalyst anions in solution in the reaction mixture. The aprotic solvent can be composed of a mixture of liquids so long as the overall liquid compositions meet the above criteria. Preferred among the aprotic solvents are N-alkyl pyrolidones, dialkyl formamides, and dialkylamides, especially those in which the alkyl groups are methyl groups. The most preferred solvent for the reaction of the present invention is N-methyl pyrrolidone. Preferably from about 1 to about 100 and most preferably from about 5 to about 20 pounds of the solvent will be present for each pound of allylic halide starting material.

The halide catalysts used for the present invention can be iodides, bromides, chlorides, or fluorides, with chlorides being preferred. Any cation can be used with the halide anions so long as the compound does not undergo undesirable side reactions with the other ingredients in the mixture to any substantial extent. Both mono- and polyhalides may be utilized. The preferred halide catalysts for the reactions of the present invention comprise $NH_4Br$, $NH_4Cl$, tetraalkyl ammonium, fluorides, chlorides and bromides, and most preferably lithium chloride. HCl may be used as the halide catalyst and may be added to the reaction mixture either in its pure form or as the HCl salt of a suitable aprotic solvent. The halide catalyst will preferably be present in quantities of from about 0.01 to about 5.0 and most preferably from 0.5 to about 1.5 moles of halide catalyst per mole of allylic halide starting material.

Chloroprene is a colorless liquid having a boiling point of about 59.4° C. at normal atmospheric pressure, which finds its principal use as a monomer from which neoprene synthetic elastomers are made. It is commonly produced by the treatment of vinyl acetylene with cold hydrochloric acid or from the chlorination of $C_4$ petroleum fractions.

1,4-dichloro-2-butene is readily available in bulk quantities at relatively low prices and thus is a particularly desirable raw material for the synthesis of chloroprene.

It has now been discovered that on heating 1,4-dichloro-2-butene in aprotic solvents, an unexpected simultaneous dehydrohalogenation and isomerization are produced which yield chloroprene in a single economical step. The reaction of the present invention is typified as follows:

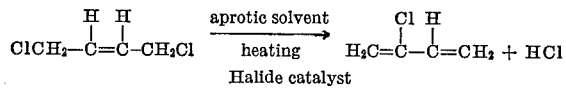

It should be noted that not only are one hydrogen and one chlorine stripped off from the 1,4-dichloro-2-butene molecule to form HCl, but also at the same time, a chlorine is caused to migrate from the alpha or omega carbon atom to the inner carbon atom which has lost its hydrogen, thus forming chloroprene. The reaction proceeds directly in a single step and in economic yields. The principal co-product produced is 1-chloro-1,3-butadiene which is itself useful as a chemical intermediate.

The temperatures and pressures under which the reaction of the present invention is conducted are not narrowly critical but temperatures of from about 50 to about 200° C. will be preferred and most preferred will be temperatures of from about 140 to about 180° C. Pressures of from about 0.01 to about 100 atmospheres will be preferred with pressures of from 0.1 to about 1.0 atmospheres being more preferred. An inert diluent such as a conventional $N_2$ purge can be used to decrease polymerization as necessary. The reaction may be conducted on a batch or continuous basis and is preferably conducted in the liquid phase to achieve maximum contact among the reactants.

The process of the present invention will be better understood by reference to the following illustrative example which should not be taken as limiting the invention in any way.

EXAMPLE I

To a solution of 4.332 g. (0.102 mole) of LiCl in 125 cc. of N-methyl pyrrolidone at 170° C. is added 12.4219 g. (0.0995 mole) of 1,4-dichloro-2-butene over a period of about 1.5 hours. The reaction is carried out in a 3-necked round bottom flask equipped with stirrer, thermometer, addition funnel and air condenser topped by a distillation head. The volatile products are trapped in a Dry Ice trap protected by a mineral oil bubbler. A few crystals of hydroquinone are added to the product receiver to inhibit polymerization.

As the reaction proceeds, the head temperature remains in the range of 48 to 53° C. After about 3 to 4 hours, the head temperature drops and the reaction is stopped and the contents of the cold trap weighed. The trap contents weighed 3.06 g. and had a refractive index of $$n_D^{23.5} = 1.4601$$

Vapor phase chromatographic analysis shows that the product mixture is composed of 63.35% chloroprene, 34.98% 1-chloro-1,3-butadiene, 1.2% materials boiling higher than 1-chloro-1,3-butadiene and 0.5% of materials boiling lower than chloroprene. This corresponds to a 22% yield of chloroprene and a 12% yield of 1-chloro-1,3-butadiene. The composition of the product mixture is confirmed by adding authentic chloroprene and authentic 1-chloro-1,3-butadiene to a sample of the product which then shows no additional peaks on analysis by vapor phase chromatography. Confirmation is also made by spectroscopy infrared which shows all bands found in the spectra of the authentic standards, by index of refraction, by ultraviolet spectroscopy which shows absorption at about 2240 A. which is characteristic of a conjugated diene, and also by elemental analysis which agrees with theory.

What is claimed is:

1. The process for the synthesis of chloroprene from 1,4-dichloro-2-butene comprising heating 1,4-dichloro-2-butene at about 50 to about 200° C. in the conjoint presence of a catalytic amount of a halide catalyst and from about 1 to about 100 pounds of an aprotic solvent per pound of 1,4-dichloro-2-butene and recovering the chloroprene thus formed.

2. The process of claim 1 wherein the aprotic solvent is selected from the group consisting of N-alkyl pyrrolidones, dialkylamides, nitrobenzenes, and acetonitrile and its alkyl derivatives.

3. The process of claim 1 wherein the halide catalyst is a chloride.

4. The process of claim 1 wherein the catalyst is lithium chloride.

5. The process of claim 2 wherein the solvent comprises a major portion of N-methyl pyrrolidone.

6. The process of claim 5 wherein the halide catalyst is lithium chloride.

References Cited

UNITED STATES PATENTS 3,079,446   2/1963   MacFarlane _____ 260—655

LEON ZITVER, Primary Examiner

J. BOSKA, Assistant Examiner